Nov. 10, 1970 W. H. BROCKMAN 3,539,922

APPARATUS FOR FILTERING STATISTICAL NOISE

Filed May 29, 1967

INVENTOR:
WILLIAM H. BROCKMAN
BY
Dawson, Tilton, Fallon, Lungmus & Alexander,
ATT'YS United States Patent Office 3,539,922
Patented Nov. 10, 1970

3,539,922

APPARATUS FOR FILTERING STATISTICAL NOISE

William H. Brockman, Ames, Iowa, assignor to Iowa State University Research Foundation Inc., Ames, Iowa, a corporation of Iowa Filed May 29, 1967, Ser. No. 642,042
Int. Cl. G01r *1/00, 19/00*
U.S. Cl. 324—111 5 Claims

ABSTRACT OF THE DISCLOSURE

Apparatus for reducing noise in a periodic input signal wherein a switching circuit receives the input signal and couples it to a first capacitor during one part of each cycle thereby charging it to a voltage at a fixed time during the cycle. The switch then couples the first capacitor in parallel with a second output capacitor for the remainder of the cycle for generating a noise free voltage representative of the average value of the voltage at the switching time.

SUMMARY

This invention relates to apparatus for minimizing noise in an electrical signal; more particularly, the invention relates to apparatus for reducing statistical noise present in a periodic electrical signal.

The apparatus of the present invention receives a periodic input signal and reduces the statistical noise level present in the signal thereby generating an average value for a particular coordinate of the periodic signal which is a more accurate representation of the original signal.

Further, the present invention provides apparatus for reducing the statistical noise in a periodic electrical signal wherein the true signal may be reconstructed by repetitive sampling of the input signal at successive time intervals from the start of the period to generate a set of average values defining a complete signature of the input signal which is free from undesirable noise.

Other advantages of the present invention will be apparent from the following detailed description accompanied by the attached drawing.

Figure 1:
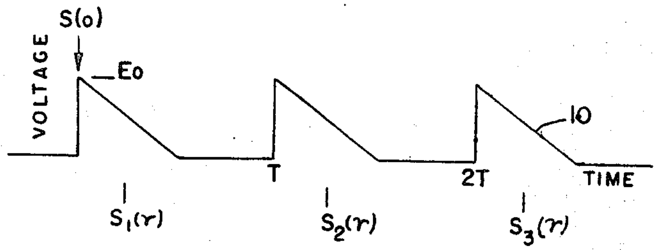
FIG. 1 is a line schematic drawing of a typical periodic electrical signal upon which the apparatus of the present invention might operate.

Referring to the drawing, a typical input waveform for analysis is shown in FIG. 1. The abscissa is voltage and the ordinate is time in the drawing. The waveform, generally designated as 10, is seen to be a backward sawtooth waveform which is periodic having a period T wherein the waveform starts at some value $E_0$ and decreases to zero volts in approximately half the period.

Figure 2:
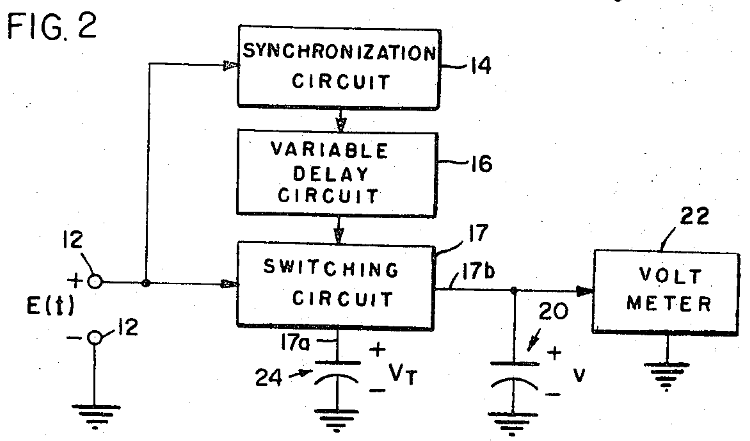
FIG. 2 is a schematic block diagram of one embodiment of apparatus according to the present invention.

The waveform 10, or any such periodic waveform is analyzed by feeding it into the input terminals 12 of the apparatus of FIG. 2. A sychronization circuit 14 receives the input signal and feeds a variable delay circuit 16. The synchronization circuit 14 is any of a class of conventional circuits such as a zero crossover detector or a Schmitt trigger circuit which senses a characteristic of the input waveform indicative of each cycle and generates a signal responsive thereto, so that in the case of the waveform shown in FIG. 1, the synchronization circuit 14 puts out a pulse when it senses the steep rise time marking the beginning of another period.

It will be obvious that a separate synchronization circuit need not be provided in cases in which there is already present a separate synchronization pulse defining a point in time which is fixed relative to the period of the waveform being analyzed.

For the waveform of FIG. 1, synchronization circuit 14 may be a simple differentiating circuit. The variable delay circuit 16 preferably takes the form of a digital monostable circuit which upon receiving an input pulse will change output states for a predetermined period of time and then switch back to its quiescent state. In the instant case, the delay circuit 16 is responsive to the output puse of the synchronization circuit 14.

A switching circuit 17 receives both the output signal of delay circuit 16 and the input waveform from input terminal 12. Switching circuit 17 may be either a relay-type circuit or a vacuum tube or transistor switching circuit. Its function is to switch one of its output terminals (17*a*) to couple either to the input terminal 12 or to its second output terminal (17*b*) depending on and responsive to the state of its second input (i.e. the output of delay circuit 16). Hence, if the output of delay circuit 16 is in its normal state, then output 17*a* is coupled to output 17*b*; conversely if the input from delay circuit 16 is in its active state as energized by an output pulse from delay circuit 16, output 17*a* is coupled to the input 12.

Connected to output 17*b* of switching circuit 17, is a capacitor 20 and a voltmeter 22. Connected to output 17*a* of switching circuit 17 is a second capacitor 24.

OPERATION

The operation of the system of FIG. 2 will now be described. A periodic input signal is fed to input terminals 12, and synchronization circuit 14 receives this input and generates a pulse at the begnning of every cycle of the input signal. Responsive to the pulse from synchronization circuit 14, the variable delay circuit 16 generates an output pulse for a predetermined time (for example, time $\tau$ of FIG. 1) to set switching circuit 17 in a state such that the capacitor 24 is connected directly to input 12 for the amount of time that delay circuit 16 is active. When delay circuit 16 returns to its quiescent state at time $\tau$, switching circuit 17 couples output 17*b* to output 17*a*. Voltmeter 22, as will be made clear subsequently, indicates the average value, free from noise, of the voltage at time $\tau$ of FIG. 1 after the apparatus has sampled a number of such cycles, indicated by $S_1(\tau)$, $S_2(\tau)$, etc.

Switching circuit 17, therefore, switches capacitor 24 to receive the input signal for a period of time equal to that time from the beginning of the cycle to time $\tau$ during each cycle. Capacitor 24 is then switched in parallel with capacitor 20 by means of switching circuit 17 until the beginning of a new cycle.

As will be seen from the following mathematical analysis, the periodic switching of capacitor 24 into circuit with the input signal results in the extraction of the average value of the input waveform at a given time during this signal period.

Assuming that the input signal of FIG. 1 is a periodic waveform with some Gaussian white noise added, and that the signal is represented as $S(t)$, and the noise as $n(t)$; the input signal may be represented as $$E(t)=S(t)+n(t)$$

$E(t)$ is sampled in synchronization with the signal $S(t)$ which may be placed anywhere within the period of $S(t)$ by controlling the active time of delay circuit 16 of FIG. 2.

For example, for the waveform of FIG. 1 in which no noise is shown for purposes of illustration, the end of the sampling period is indicated as $S_1(\tau)$ in the first period, and $S_2(\tau)$ in the second period, and so on, being generally represented as $S_n(\tau)$, as indicated above. Each sampling time for successive periods is identical in this basic example.

When capacitor 24 is connected to receive the input signal, $V_T=E(\tau)$, where $V_T$ is the voltage across capacitor 24. We assume that there is no initial charge on capacitor 20, and let $Q_T$ be the charge on capacitor 24 and $Q_S$ be the charge on capacitor 20. In the following computation, $C_S$ will represent capacitor 20 and $C_T$ will represent capacitor 24 of the drawing.

Just prior to the end of the first sample (time $\tau$ of FIG. 1), $C_T$ is connected to receive the input signal, and the charge on $C_T$ is $Q_T=C_TE(\tau)$. When $C_T$ is then connected to $C_S$ at sample 1, the total charge of the parallel capacitance $C=C_T+C_S$ is $Q=Q_T+Q_S$ and the voltage across capacitor 20 is $V=Q/C$. Thus:

$$V(0)=0$$

$$V(1)=\frac{Q_1}{C}=\frac{Q_T}{C_T+C_S}=\frac{C_TE(\tau)}{C_T+C_S}$$

If $$\frac{C_S}{C_T+C_S}=\alpha;\text{ then, } V(1)=(1-\alpha)E(\tau)$$

At sample 2, $(S_2(\tau))$, the situation is as follows:

$$V(2)=\frac{Q_2}{C}=\frac{Q_T+Q_S}{C_T+C_S}=\frac{C_TE(\tau)}{C_T+C_S}+\frac{V_1C_S}{C_T+C_S}$$

$$\therefore V(2)=\alpha V(1)+(1-\alpha)E(\tau)$$

In general, it is seen that:

$$V(N)=\alpha V(N-1)+(1-\alpha)E(\tau)$$

This is a recursive form of a geometric progression and may be written in closed form as:

$$V(N)=(1-\alpha^N)E(\tau)$$

It can further be shown that if $E(\tau)$ is not deterministic, the value of $V(N)$ is:

$$V(N)=(1-\alpha^N)\overline{E(\tau)}$$

where $\overline{E(\tau)}$ is the average value of the waveform take $\tau$ seconds following the arbitrary synchronization point. This analysis is based on Monte Carlo or Random Walk techniques applied to a Markov process. In addition, and more importantly, the variance of $E(\tau)$ is $$\sigma^2_{V(N)}=(1-\alpha^{2N})\frac{(1-\alpha)}{(1+\alpha)}\sigma^2_{E(\tau)}$$

The significance of these relationships is as follows. At the input:

$E(t)=S(t)+n(t)$ and, for the case of zero mean Gaussian noise, $$\sigma^2_{S(t)}=0;\ \sigma^2_{n(t)}\neq 0$$

$$\overline{S(t)}\neq 0;\ \overline{n(t)}=0$$

When N is large $(\alpha^N\ll 1)$.

$$V=\overline{S(\tau)}+\overline{n(\tau)}=\overline{S(\tau)}$$

$$\sigma^2_V\cong\frac{1-\alpha}{1+\alpha}\sigma^2_{n(\tau)}$$

Thus the computation carried out in repetitive sampling through capacitive switching as described above results in the extraction of the average value of the input waveform at a given time during the signal period. In the case discussed, the result is the extraction of the signal. The variance of the output is reduced in comparison to the input by a factor of $$\frac{1-\alpha}{1+\alpha}$$

This is equivalent to reducing the RMS noise voltage, $n(t)$, by a factor of $$\sqrt{\frac{1-\alpha}{1+\alpha}}$$

The computations are complete only when $\alpha^M\ll 1$. An estimate of the number of samples necessary for this to occurs is $$\frac{5}{1-\alpha}$$

This insures that $\alpha^M<0.01$. It will be noted that the noise reduction process is complete at the point where $(1-\alpha^{2N})\cong 1$, but the output signal level does not reach its asymptote until $(1-\alpha^M)=1$.

In summary, the effects of the sampling computations brings about a reduction of the RMS noise voltage by a factor of $$\sqrt{\frac{1-\alpha}{1+\alpha}}\text{ if }\frac{5}{1-\alpha}$$

samples are taken.

In approximation form, it can be shown that when $\alpha\rightarrow 1$, the signal-to-noise ratio is improved by a factor of $I=0.63\sqrt{M}$ where M is the required number of samples, and $M=5/(1-\alpha)$.

Typical theoretical results are shown in the following table.

TABLE 1

| $\alpha$ | I | M |
|---|---|---|
| 0.5 | 2.0 | 10 |
| 0.9 | 4.45 | 50 |
| 0.95 | 6.3 | 100 |
| 0.99 | 14.05 | 500 |
| 0.999 | 44.5 | 5,000 |

The improvement (I) is seen to be significant for $\alpha\geqq 0.9$.

It is important to note that $S(t)$ can be completely reconstructed only by making a sampling computation at a succession of incrementally increasing delay times in the signal period. The signal extraction thus proceeds in a sequential series of voltage-time coordinate determinations. A main feature of the instant invention, as described in more detail below, is the fact that noise occurring in a particular frequency range of interest in the signal can thus be eliminated.

Figure 3:
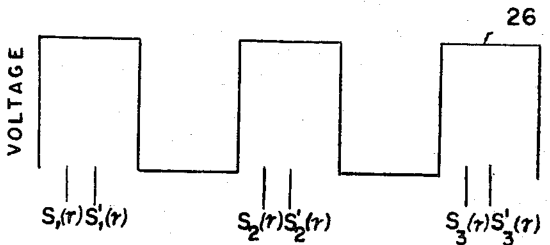
FIG. 3 illustrates another periodic input waveform illustrating other features of the invention.
Figure 4:
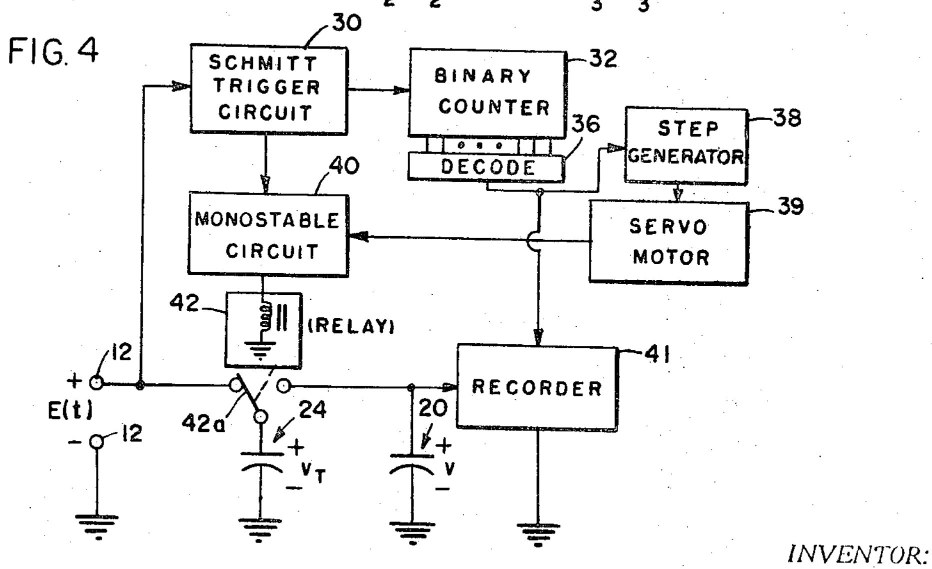
FIG. 4 is apparatus according to the present invention for generating a complete noise-free signature of an input periodic waveform.

Referring again to the drawing, and more patricularly to FIG. 3, a periodic square wave, designated generally as 26 is shown. As will be seen, the apparatus of FIG. 4 is adapted to generate a complete set of voltage values representative of the input signal. A Schmitt trigger circuit 30 receives the input voltage from terminal 12*a*. Schmitt trigger circuit 30 is a conventional circuit which has a binary output and assumes one output state when the input voltage exceeds a certain level and assumes a second state when the input voltage falls below that level. A conventional binary counter 32 comprising a series of bistable circuits connected to count a train of input pulses receives the output of Schmitt trigger circuit 30.

A decode circuit 36, which typically may be a conventional diode decoder, receives the parallel output of the bistables of counter 32 and delivers a pulse to its output when the corresponding outputs of counter 32 register the binary number which decoder 36 is designed to interpret. A step generator 38 receives the output of decoder 36 and drives a servomotor 39. Decoder 36 also delivers timing information to a recorder device 41 which records the average signal developed across capacitor 20 when gated by the signal from decoder 36. The recorder 41 replaces the voltmeter of the previous apparatus.

Servomotor 39 incrementally increases the time constant of the timing circuit in a monostable circuit 40 which receives the output of Schmitt trigger circuit 30. A relay 42 is driven by the output of monostable circuit 40 to drive its contact arm, generally designated as 42*a*, to switch the input signal to capacitor 24 before the end of the sampling time and to switch capacitor 24 in parallel with capacitor 20 during the remaining portion of the period of the input waveform.

The circuit operates as follows. The Schmitt trigger circuit 30 receives the input signal and generates an output pulse when the input voltage exceeds zero volts. In the instant case, it will be noted that output of Schmitt trigger 30 appears identical to the waveform 26 and its main function is to supply timing information to the rest of the circuitry. Monostable circuit 40 receiving the output of Schmitt trigger circuit 30 generates a sampling pulse having a width equal to the time from the beginning of a period to the time $S_1$ shown in FIG. 3.

The output of monostable circuit 40 then drives relay 42 and during the first portion of its first output, contact 42*a* will allow the input voltage $E(t)$ to charge capacitor 24. At the end of the time of the output of monostable circuit 40, relay 42 wil be activated and contact 42*a* will switch capacitors 20 and 24 in parallel as shown. Hence, a number of samples occurring at the same time during successive periods of the input waveform will be taken and stored in capacitor 20, as with the prior apparatus. The total number of samples is determined by the above relationship for M. The binary counter 32 is set to count each time one of these samples occurs so that the number M is counted in counter 32. When the output of counter 32 reaches the number M, decoder 36 will put out a pulse which indicates to recorder device 41 that a particular average value for the signal voltage has been determined and should be recorded. At the same time decoder 36 will generate an output pulse to step generator 38 which advances servomotor 39 to increase the time constant (by increasing either the resistance or the capacitance) of the timing circuit of monostable 40 thereby increasing the sampling time by a predetermined increment. Thus referring to FIG. 3, the sampling time changes to $S_1'(\tau)$ in this manner. The sampling time can be made to sweep through a given period and when taken together with the information recorded on the recording device 41, a complete signature of the input signal can be generated or reconstructed with all of the undesirable noise removed from it.

Although particular embodiments of my invention have been set forth for purposes of illustration, it is to be understood that I intend to cover all equivalent structure and modifications within the skill of the art embraced within the spirit and scope of the appended claims.

I claim:

1. Apparatus for reproducing a repetitive electrical input signal in the presence of noise comprising: a first and a second capacitor adapted to be switched in parallel; synchronization means for generating a synchronization signal in timed relation with said input signal; switching means for coupling said first capacitor to receive said input signal at a predetermined sampling time during each cycle of a number of cycles of said input signal thereby to store a signal on said first capacitor representative of said input signal at said sampling time, said switching means thereafter disconnecting said first capacitor from said input signal and then connecting said first capacitor in parallel with said second capacitor to store a signal on said second capacitor representative of a noise-free, average value of said input signal at said sampling time; delay means receiving said synchronization signal for generating a delay signal a predetermined time atfer the occurrence of said synchronization signal to energize said switching means to switch said first capacitor in parallel with said second capacitor after disconnecting said first capacitor from said input signal; and circuit means for incrementally increasing the time said delay signal occurs after said synchronization signal when a predetermined number of cycles of said input signal have occurred whereby said second capacitor stores signals representative of the noise-free average value of said input signal at successive increments of time and in timed relation to said input signal.

2. The apparatus of claim 1 wherein said delay means comprises a monostable circuit including a timing circuit for generating said delay signal a predetermined time after receiving the output signal of said synchronization means.

3. The apparatus of claim 2 wherein said means for incrementally increasing the time of said delay signal comprises counter means for counting a predetermined number of said synchronization signals; decode means receiving the output signal of said counting means for generating a pulse responsive to said predetermined number of synchronization signals being counted; and means receiving said decode means pulse for increasing the time constant of said monostable circuit.

4. The apparatus of claim 3 further comprising recording means for recording the value of the signal across said second capacitor in response to said decode means.

5. The apparatus of claim 2 wherein said switching means comprises a relay coupling said first capacitor to receive said input signal when said relay is not energized and coupling said first and second capacitors in parallel when said relay is energized by said monostable circuit.

References Cited

UNITED STATES PATENTS

| | | | |
|---|---|---|---|
| 2,413,023 | 12/1946 | Young | 332—1 |
| 2,532,338 | 12/1950 | Schlesinger | 329—109 XR |
| 2,591,738 | 4/1952 | Spencer | 324—102 |
| 2,778,933 | 1/1957 | Crist | 329—109 XR |
| 2,951,181 | 8/1960 | Sugarman | 324—120 XR |
| 3,010,071 | 10/1961 | Carlson | 328—151 XR |
| 3,011,129 | 11/1961 | Magleby et al. | 328—151 XR |
| 3,069,559 | 12/1962 | Chaplin et al. | 328—151 XR |
| 3,229,212 | 1/1966 | Rogers | 328—151 |
| 3,244,989 | 4/1966 | Carlson | 328—151 |
| 3,248,655 | 4/1966 | Kobbe et al. | 328—151 |
| 3,214,699 | 10/1965 | Jackowatz | 324—111 XR |
| 3,278,846 | 10/1966 | Patten et al. | 324—111 XR |

RUDOLPH V. ROLINEC, Primary Examiner

E. F. KARLSEN, Assistant Examiner

U.S. Cl. X.R.

324—102; 328—151